Patented May 2, 1944

2,347,827

UNITED STATES PATENT OFFICE 2,347,827

LINEAR POLYMERIC ISOTHIOUREA AND SALTS THEREOF

Madison Hunt, Claymont, Del., assignor to E. I. du Pont de Nemours & Company, Wilmington, Del., a corporation of Delaware No Drawing. Application March 31, 1942,
Serial No. 437,091

15 Claims. (Cl. 260—2)

This invention relates to new polymeric products and more particularly to polymeric isothiourea salts.

This invention has as an object the preparation of new bactericidal and bacteriostatic materials. A further object is the provision of new pesticidal materials. Further objects will appear hereinafter.

These objects are accomplished by the following invention of acid addition salts of linear polymeric isothioureas, i. e., linear polymers having a plurality of intralinear isothiourea salt groupings having the formula

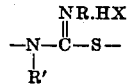

wherein X is the anion of an acid of dissociation constant of at least $1 \times 10^{-5}$ and R and R' are hydrogen or lower alkyl, including cycloalkyl radicals, i. e., of one to six carbon atoms, said isothiourea groups being separated by and connected to bivalent organic radicals equivalent in chemical inertness to bivalent hydrocarbon radicals and ether interrupted hydrocarbon radicals, the intralinear nitrogen atom of the isothiourea groups being attached to said organic radicals through carbon free from aliphatic unsaturation, and the sulfur atom of the isothiourea groups being attached to said organic radicals through only singly bonded carbon.

The expression "free from aliphatic unsaturation" means that the carbon atom connecting the organic radical to the intralinear nitrogen atom of the isothiourea group is either aromatic, i. e., part of an aromatic ring, or, if aliphatic, is only singly bonded.

The isothiourea groups may be defined as intra-linear isothiourea addition salt groups, i. e., groups having a central intralinear carbon atom joined to intralinear carbon atoms of the chain on the one side through a tervalent nitrogen atom, whose third valence is satisfied by hydrogen or a monovalent hydrocarbon radical and on the other side thru a bivalent sulfur atom, the remaining valences of the carbon being satisfied by an extralinear nitrogen atom, the remaining valence of which is satisfied by hydrogen or an alkyl radical.

The linear polymeric isothiourea addition salts may be prepared by reacting, at a temperature between about 75° C. and about 200° C., a compound having, as its sole reacting groups, two thiourea groups attached to the rest of the molecule through carbon atoms free of aliphatic unsaturation, with a compound having as its sole reacting groups two halogen atoms of atomic weight of at least 35 attached to only singly bonded carbon, preferably diprimary dihalides, and preferably in the presence of a solvent in which both reactants are at least slightly soluble. The heating is continued as a rule for 24 hours, whereupon the compound may be isolated by filtration or by concentration of the solution, depending upon its solubility in the solvent chosen. The compounds are white solids, slightly soluble in water and in alcohol. The materials are readily hydrolyzed by boiling alkali to give a compound having two mercaptan groups and a compound having two urea groups, e. g., an alkanedithiol and an alkylene-bis-urea. Drastic alkali treatment causes the hydrolysis of the bis-urea to give ammonia, carbon dioxide, and a diamine.

In the process of the present invention two reactants, one having two thiourea groups as its only reacting groups and those attached to the rest of the molecule through carbon free of aliphatic unsaturation, and one having two halogens of atomic weight above 35 as its only reacting groups, each attached to but a singly bonded, preferably methylene, carbon, are reacted to form a polymer as indicated by the following equation:

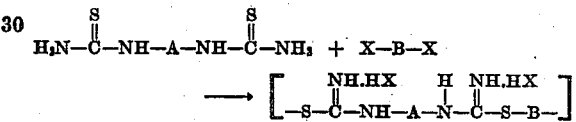

In order to obtain the polymeric isothiourea, several necessary conditions must be fulfilled. First, the bis-thiourea must have at least one hydrogen atom on either one or the other nitrogen of each thiourea group, said thiourea groups being attached to the rest of the molecule through carbon free of aliphatic unsaturation. Second, the connecting radicals A and B must be free of other chemically reactive groups which would interfere with the polymer-forming reaction, i. e., must be equivalent to the bivalent hydrocarbon radical or a bivalent hydrocarbon radical interrupted by ether oxygen. Third, the halogen atoms in the dihalide must have sufficient reactivity to react with the thiourea; for practical purposes this restricts the dihalides to chlorides, bromides, iodides, chloride bromides, chloride iodides, and bromide iodides having the halogen attached to only singly bonded, i. e., aliphatic (including cycloaliphatic) carbon and preferably primary halides, i. e., halides having the halogen attached thru —CH₂— to the remainder of the molecule. For convenience, these preferred primary dihalides are referred to as having the halogen attached to a carbon atom of the methylene type. The suitable thioureas and dihalides are specified in more detail below. The two reactants are brought together in approximately equivalent molecular proportions.

The more detailed practice of the invention is illustrated by the following examples, wherein parts given are by weight. There are, of course, many forms of the invention other than these specific embodiments.

EXAMPLE I.—*Preparation of polymeric S,S'-decamethylene - N,N'- decamethylene - diisothiourea-hydroiodide*

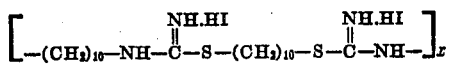

A mixture of 98.5 parts of decamethylene diiodide and 72.6 parts of 1,1'-decamethylene-bis(2-thiourea) is suspended in 350 parts of absolute ethyl alcohol. The solution is refluxed for 2 hours. The clear reaction mixture is cooled and three volumes of ether are added to precipitate the product. The solid which separates is dried in vacuo, yielding 147 parts of a white powdery material. This material is readily soluble in methyl and ethyl alcohol but insoluble in ether, benzene or water. Analysis: Calculated for $C_{22}H_{44}N_4S_2.2HI$: N, 8.18%; found: N, 7.67%.

EXAMPLE II.—*Preparation of polymeric S,S'-hexamethylene - N,N'- hexamethylene - diisothiourea hydrobromide*

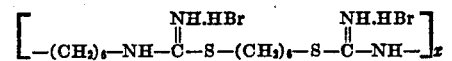

A mixture of 11.7 parts of 1,1'-hexamethylene bis-(2-thiourea) and 12.2 parts of hexamethylene dibromide in 100 parts of absolute alcohol is refluxed for 24 hours. The solution is cooled and 200 parts of ether is added. The solid product is separated by filtration and is dried in vacuo. The yield is 15.7 parts of a light yellow product which is sparingly soluble in water and in alcohol and insoluble in ether and benzene.

EXAMPLE III.—*Preparation of polymeric S,S'-p-xylylene-N,N'-hexamethylenediisothiourea hydrobromide*

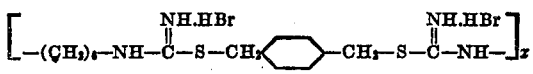

A mixture of 26.4 parts of p-xylene bromide and 23.4 parts of 1,1'-hexamethylene bis(2-thiourea) in 300 parts of toluene is refluxed with stirring for 18 hours. The separated solid is filtered and washed with ether. The product is dried in vacuo to a white powder. The yield is 42 parts. The product is sparingly soluble in water and alcohol and insoluble in ether or benzene. Analysis: Calculated for $C_{16}H_{24}S_2N_4.2HBr$; Br, 32.06%; found: Br, 33.06%.

EXAMPLE IV.—*Preparation of polymeric S,S'-decamethylene-N,N'-hexamethylene-diisothiourea hydrobromide*

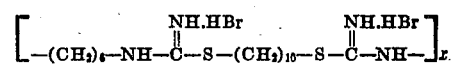

A mixture of 30.0 parts of decamethylene dibromide and 23.4 parts of 1,1'-hexamethylene bis-(2-thiourea) are refluxed in 300 parts of absolute alcohol for 18 hours. The alcohol is removed by evaporation, and the product is dried in vacuo.

The yield is 48 parts. This product is sparingly soluble in water and in alcohol and insoluble in ether or benzene. Analysis: Calculated for $C_{18}H_{38}N_4S_2.2HBr$: Br, 29.97%; found: Br, 29.37%.

It will be understood that the above examples are for purposes of illustration only and that the invention is not limited to the exact products, reactants, conditions and processes therein described but rather is susceptible of wide variation. Thus, there are a great number of widely diversified polymeric substances, having recurring isothiourea groups, that can be formed by the methods illustrated. In forming these polyisothioureas a variety of reactants may be used in addition to those previously mentioned. Thus, any bis-thiourea of the formula

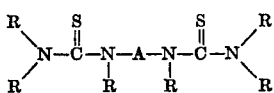

may be used. In this formula A is an organic radical free from reactive groups, i. e., equivalent in inertness, i. e., low chemical reactivity, to a hydrocarbon or ether interrupted hydrocarbon radical. The R's may be the same or different but at least one R on each thiourea group must be hydrogen. The remaining R groups may be hydrogen or alkyl (including cycloalkyl) groups of from one to six carbon atoms. The preferred types are those in which R is hydrogen. Suitable dithioureas include 1,1' - methylene - bis(2-thiourea), 1,1'-ethylene-bis(2 - thiourea), 1,1'-trimethylene-bis(2-thiourea), 1,1'-tetramethylene-bis(2-thiourea), 1,1'-pentamethylene-bis(2-thiourea), 1,1'-hexamethylene-bis(2-thiourea), 1,1'-heptamethylene - bis(2 - thiourea), 1,1' - octamethylene-bis(2-thiourea), 1,1'-decamethylene-bis(2 - thiourea), 1,1'-dodecamethylene - bis(2-thiourea), 1,1' - tetradecamethylene-bis(2-thiourea), 1,1'-para-phenylene-bis(2-thiourea), 1,1'-ortho - phenylene - bis(2-thiourea), 1,1'-para-xylylene - bis(2 - thiourea), 1,1'-meta-xylylene-bis(2 - thiourea), 1,1'- tetrahydrofurane-2,5-dimethylene-bis(2- thiourea), 1,1'-oxydiethylene-bis(2-thiourea)

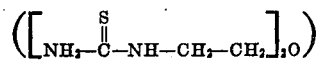

1,1'-dioxytriethylene-bis(2-thiourea)

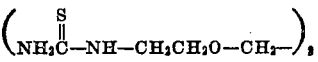

1,1' - hexamethylene - bis(3 -methyl-2-thiourea), 1,1'-hexamethylene-bis(3-butyl-2-thiourea), 1,1'-decamethylene - bis(3 - cyclohexyl - 2-thiourea), 1,1' - hexamethylene - bis(3-methyl-3-ethyl - 2-thiourea), 1,1'-hexamethylene - bis(3-butyl-1-ethyl-2-thiourea), and 1,1'-decamethylene-bis(1-ethyl-2-thiourea). Unsaturated bis thioureas may be employed, including 1,1'-stilbene-4,4'-bis(2-thiourea), $1,1'\Delta^{3,4}$-hexene-1,6 - bis(2 - thiourea) and $1,1'\Delta^{5,6}$-decylene-1,10-bis(2-thiourea). However, the carbon attached to the thiourea group should be free from aliphatic unsaturation.

The reactants used to prepare the polymeric isothiourea salts are readily obtained by well-known methods. The dithioureas are prepared by reaction of the corresponding diisothiocyanates, e. g., hexamethylene diisothiocyanate or decamethylene diisothiocyanate, with ammonia or primary and secondary monoamines such as ethylamine, methylamine, butylamine, isobutylamine, dimethylamine, dicyclohexylamine, etc. The preparation of dithioureas is disclosed in the copending application of L. Gilman, Serial No. 283,123, filed July 6, 1939.

The polyisothiourea-forming dihalides have the formula $$X—B—X'$$

wherein X and X' are the same or different halogen of atomic weight of at least 35. Sulfate or phosphate esters may be used in place of the dihalides. The preferred type of compound is a dihalide in which X and X' are the same, and are chlorine or bromine. As indicated above, the halogen atoms must be attached to aliphatic carbon atoms, preferably of the methylene type, i. e., preferably of a —CH$_2$— group. Thus p-dichlorobenzene and p-dibromobenzene, although capable of reaction with thioureas, require such drastic conditions as to be of little utility in the polymer-forming reaction. However, dihalides of the aralkylene type such as p-xylylene dichloride and 1,4-bis(beta-chloroethyl) benzene resemble the aliphatic halides in reactivity with thioureas and are operable in the process.

The bivalent organic radical B must be free from reactive groups, i. e., equivalent in inertness to a hydrocarbon or ether interrupted hydrocarbon radical. The carbon atoms carrying the halogen atoms must be only singly bonded; i. e., halogen compounds having the halogens on ethylenically unsaturated carbons, e. g., sym-dichloro-ethylenes or on aromatic ring carbons, i. e., p-dibromobenzene are excluded. Any dihalide having its halogens attached to only singly bonded carbon may be employed including methylene bromide, methylene iodide, ethylene dichloride, trimethylene dibromide, tetramethylene dichloride, pentamethylene dichloride, hexamethylene dibromide, decamethylene dibromide, decamethylene diiodide, dodecamethylene dichloride, tetradecamethylene dibromide, p-xylylene dichloride, m-xylylene dibromide, o-xylylene dichloride, 1,4-bis(beta-chloroethyl)benzene, 1,4-dichlorocyclohexane, 1,3-dibromocyclopentane, 1,4-bis(chloromethyl)naphthalene, 2,3-dichlorodioxane, 2,5-bis(chloromethyl)tetrahydrofurane, dibromodimethyl ether, gamma-gamma'-diiododipropyl ether, $\beta,\beta'$-dichlorodiethyl ether, triglycol dichloride (Cl—CH$_2$—CH$_2$—O—CH$_2$—CH$_2$—O—CH$_2$—CH$_2$—Cl), 1,4-dichlorobutene-2, 1,10-dibromodecene-5, 4,4'-dibromomethylstilbene.

The reactants are normally employed in stoichiometric proportions. However, the proportions may be varied somewhat, e. g., up to about 15 mol per cent excess of one of the ingredients, in which case a stabilized polymer of lower molecular weight and with a preponderance of identical end groups and these corresponding to the reactant used in excess is formed. Simple mono halogen compounds such as alkyl halides (e. g., butyl bromide) or simple monomeric alkyl thioureas (e. g., mono-n-butyl thiourea) may likewise be used in small amounts, e. g., up to twenty mol per cent to stabilize the products and lower the molecular weight. However, the preferred type of compound is that obtained using substantially equivalent amounts of the two reactants.

The reaction may be carried out with or without a solvent. However, it is preferable to operate in an inert solvent, in which the starting materials are at least partially soluble. Suitable solvents include toluene, methyl alcohol, ethyl alcohol, butyl alcohol, dioxane, and glacial acetic acid.

The reaction may be carried out at temperatures from 75 to 200° and at atmospheric, superatmospheric, or subatmospheric pressures. The preferred temperature is 100–120° at atmospheric pressure. Toluene is a very suitable solvent for the reaction since the temperature of refluxing toluene falls within this range at atmospheric pressure.

The products of this invention have the generic formula

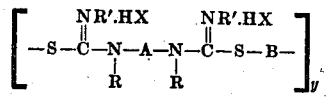

in which A and B are bivalent organic radicals free from reactive groups, i. e., hydrocarbon and ether interrupted hydrocarbon radicals and radicals equivalent to these, the valences joining A to the nitrogens stemming from carbon free from aliphatic unsaturation and the valences joining B to the sulfurs stemming from singly bonded carbon atoms, R and R' are hydrogen or the same or different alkyl (including cycloalkyl) radicals of from one to six carbon atoms, X is the anion of an acid of ionization constant of at least $1 \times 10^{-5}$ at 25° C. and $y$ is a whole number greater than 1.

The radicals A and B connecting the isothiourea salt groups are preferably hydrocarbon because of the more ready availability of the intermediates for the preparation of these salts, and polymethylene connecting radicals are particularly preferred. The two radicals may be the same or they may be different. They may contain aliphatic, cycloaliphatic, aromatic, or heterocyclic groups, or they may represent a mixture of these types consisting of two or more of these in combination. The two radicals A and B may be altogether different types; i. e., A may be aromatic and B may be aliphatic. The preferred type is that in which A and B are bivalent polymethylene chains having 6 to 10 carbon atoms.

The groups R and R' may be hydrogen or they may be alkyl, including cycloalkyl, groups of from one to six carbon atoms.

When either R or R' is hydrogen, there exists the possibility of tautomerism between two formulas as shown below:

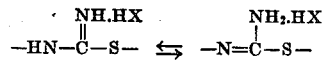

This invention is intended to include the isothiourea salts and all their tautomeric forms.

The acid anion X is the anion of any inorganic or organic acid of ionization constant greater $1 \times 10^{-5}$ at 25° C., including acetic, citric, tartaric, chloroacetic, trichloroacetic, benzoic, $\alpha$-bromopropionic, butyric, lactic, hydrochloric, hydrobromic, hydroiodic, phosphoric, sulfuric, nitric, periodic, chloric, etc. The preferred types are the acid anions derived from strong inorganic acids (ionization constant of $1 \times 10^{-3}$ at 25° C.), such as hydrochloric, hydrobromic, sulfuric, or phosphoric acids. When the anion of the acid desired is not associated with the isothiourea base in the primary reaction product of the dihalide (disulfate, diphosphate) and dithiourea, the desired salt may be prepared from the primary reaction product as follows: the acid anion X is readily removed to yield the free polymeric isothioureas by addition of the calculated quantity of an alkali such as sodium or potassium hydroxide to an aqueous solution of the polymeric salt and the free isothiourea is reconverted to the salt of the desired acid.

For example, an aqueous solution containing 4.78 parts of N,N'-hexamethylene-S,S'-hexamethylenediisothiourea hydrobromide is made alkaline by the addition of 80 parts of sodium hydroxide (as much as 100 parts of sodium hydroxide may be employed) or with 56.1 parts of potassium hydroxide. The free polymeric N,N'-hexamethylene-S,S'-hexamethylenediisothiourea separates from the solution as a tacky solid. This material is insoluble in water and in nonpolar organic solvents such as ether and benzene, but is soluble in alcohol. The free diisothiourea may then be converted to the desired salt by treatment with aqueous solutions of acids such as hydrochloric, sulfuric, phosphoric, hydrobromic, nitric, acetic or citric. The solution then contains the corresponding acid salt.

In a similar manner other polymeric isothiourea salts may be converted to the free bases and then by the addition of an acid into a new salt.

The free polymeric base, while not appreciably soluble in water, shows disinfectant activity as a tincture in alcohol.

The products are useful as pesticides and especially as bactericides and bacteriostatic agents. Polymeric S,S'-hexamethylene-N,N'-hexamethylene diisothiourea hydrobromide, when tested by the standard FDA (Food and Drug Administration) method against *Staphylococcus aureus* showed a killing dilution of 1:30,000 in 10 minutes. The compound retains a major portion of its activity against *Staphylococcus aureus* even when tested in the presence of horse blood serum. A dilution of 1:20,000 was found to be bactericidal in 10 minutes under these conditions. The compound also showed relatively strong bactericidal activity against *Staphylococcus aureus* in the presence of whole blood since the killing dilution under these conditions was found to be 1:30,000 in 30 minutes. The compound shows bacteriostatic action against *Staphylococcus aureus* when tested in broth at dilutions of 1:130,000. This polymer is also active against *B. coli* and *B. typhosus*.

The above description and examples are intended to be illustrative only. Any modification of or variation therefrom which conforms to the spirit of the invention is intended to be included within the scope of the claims.

What is claimed is:

1. A linear polymeric isothiourea wherein the isothiourea groups are joined through the sulfur and one of the nitrogens of the isothiourea group by members of the class consisting of bivalent hydrocarbon radicals and bivalent ether interrupted hydrocarbon radicals, alternate members of said class being joined at both ends to sulfur atoms of isothiourea groups and the remaining members of said class being joined at both ends to nitrogen atoms of isothiourea groups the intralinear nitrogen atom of the isothiourea groups being attached to said radical through carbon free from aliphatic unsaturation and the sulfur atom of the isothiourea groups being attached to said radical through only single bonded carbon, the valences of the nitrogens of the isothiourea groups which are not satisfied by intralinear atoms of the polymer being satisfied by members of the class consisting of hydrogen and alkyl groups of from one to six carbon atoms.

2. An addition salt of the compound of claim 1 with an acid of ionization constant of at least $1 \times 10^{-5}$.

3. A linear polymeric isothiourea wherein the isothiourea groups are joined through the sulfur and one of the nitrogens of the isothiourea group by bivalent hydrocarbon radicals, alternate intralinear bivalent hydrocarbon radicals being joined at both ends to sulfur atoms of isothiourea groups and the remaining intralinear bivalent hydrocarbon radicals being joined at both ends to nitrogen atoms of isothiourea groups, the radicals joining the sulfur atoms of vicinal isothiourea groups having their free valences stemming from only singly bonded carbon and the radicals joining the intralinear nitrogen atoms of vicinal isothiourea groups having their free valences stemming from carbon free from aliphatic unsaturation, and the valences of the nitrogens of the isothiourea groups beyond those satisfied by intralinear atoms being satisfied by hydrogen.

4. An addition salt of a compound according to claim 3 with an acid of ionization constant of at least $1 \times 10^{-5}$.

5. An addition salt of a compound according to claim 3 with a hydrohalogen acid of molecular weight of at least 36.

6. An addition salt of an acid of ionization constant of at least $1 \times 10^{-5}$ with a linear polymeric isothiourea wherein the isothiourea groups are separated by polymethylene radicals, alternate intralinear polymethylene radicals being joined at both ends to sulfur atoms of isothiourea groups and the valences of the nitrogens of the isothiourea groups beyond those satisfied by intralinear atoms are satisfied by hydrogen.

7. An addition salt of a hydrohalogen acid of molecular weight of at least 36 with a linear polymeric isothiourea wherein the isothiourea groups are separated by polymethylene radicals, alternate intralinear polymethylene radicals being joined at both ends to sulfur atoms of isothiourea groups and the valences of the nitrogens o the isothiourea groups beyond those satisfied by intralinear atoms are satisfied by hydrogen.

8. Polymeric S,S'-decamethylene-N,N'-decamethylenediisothiourea hydroiodide

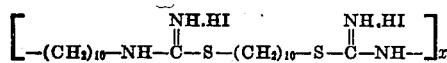

wherein $x$ is an integer greater than one.

9. Polymeric S,S'-hexamethylene-N,N'-hexamethylenediisothiourea hydrobromide

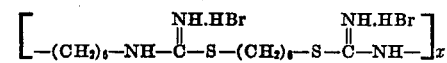

wherein $x$ is an integer greater than one.

10. Process which comprises reacting at a temperature within the range 75–200° C., an organic dihalide of the class consisting of hydrocarbon dihalides and ether interrupted hydrocarbon dihalides wherein the halogens are of atomic weight of at least 35 and are attached to only singly bonded carbon, with an organic compound having as its only reacting groups two thiourea groups one nitrogen atom of each of which is attached thru carbons free from aliphatic unsaturation to a member of the class consisting of bivalent hydrocarbon radicals and ether interrupted bivalent hydrocarbon radicals, each of said thiourea groups having at least one hydrogen on a nitrogen of said groups, the remaining valences of the nitrogen of said groups being satisfied by members of the class consisting of hydrogen and alkyl groups of from one to six carbon atoms.

11. Process which comprises reacting, at a temperature within the range 75–200° C., a hydrocarbon dihalide wherein the halogens are of atomic weight of at least 35 and are attached to only singly bonded carbon, with an organic compound having a bivalent hydrocarbon radical attached, thru carbons free from aliphatic unsaturation, to one nitrogen atom of each of two thiourea groups, the remaining valences of the nitrogens of the thiourea groups being satisfied by hydrogen.

12. Process which comprises reacting, at a temperature within the range 75–200° C., a polymethylene dihalide with a polymethylene dithiourea wherein the polymethylene radical is attached to one nitrogen of each of the thiourea groups, the remaining valences of the nitrogens of the thiourea groups being satisfied by hydrogen.

13. Process of claim 10 wherein the reaction is conducted in an inert solvent.

14. A pest control composition useful for controlling economically harmful lower forms of life including bacteria, fungi and insects, containing as an active ingredient a member of the class consisting of linear polymeric isothioureas and addition salts thereof, wherein the isothiourea groups are joined, thru the sulfur atom and one of the nitrogen atoms of the isothiourea group, by members of the class consisting of bivalent hydrocarbon radicals and bivalent ether interrupted hydrocarbon radicals, alternate members of said class being joined at both ends to sulfur atoms of isothiourea groups and the remaining members of said class being joined at both ends to nitrogen atoms of isothiourea groups said radicals having the free valences attached to the intralinear sulfur stemming from only singly bonded carbon, and the free valences attached to intralinear nitrogen stemming from carbon free from aliphatic unsaturation, the valences of the nitrogens of the isothiourea groups which are not satisfied by intralinear atoms being satisfied by members of the class consisting of hydrogen and alkyl groups of from one to six carbon atoms.

15. A pest control composition useful for controlling economically harmful lower forms of life including bacteria, fungi and insects, containing as an active ingredient an addition salt, with an acid of ionization constant of at least $1 \times 10^{-5}$, of a linear polymeric isothiourea, wherein the isothiourea groups are joined, through the sulfur atom and one of the nitrogen atoms of the isothiourea group, by members of the class consisting of bivalent hydrocarbon radicals and bivalent ether interrupted hydrocarbon radicals, alternate members of said class being joined at both ends to sulfur atoms of isothiourea groups and the remaining members of said class being joined to nitrogen atoms of isothiourea groups, said radicals having the free valences attached to the intralinear sulfur stemming from only singly bonded carbon, and the free valences attached to intralinear nitrogen stemming from carbon free from aliphatic unsaturation, the valences of the nitrogens of the isothiourea groups which are not satisfied by intralinear atoms being satisfied by members of the class consisting of hydrogen and alkyl groups of from one to six carbon atoms.

MADISON HUNT.